United States Patent [19]
Forest

[11] Patent Number: 5,601,322
[45] Date of Patent: Feb. 11, 1997

[54] AQUARIUM TOOL

[76] Inventor: Robert Forest, 8000 Offenhauser Rd. #6E, Reno, Nev. 89511

[21] Appl. No.: 559,939

[22] Filed: Nov. 17, 1995

[51] Int. Cl.$^6$ .................................. B25B 7/22; B25J 1/02
[52] U.S. Cl. .................................. 294/3; 294/118; 7/168; 15/105
[58] Field of Search .................................. 294/3, 16, 19.1, 294/24, 28, 50.8, 51, 118, 119; 43/7, 11, 12; 7/167, 168; 30/123, 150; 15/1.7, 105, 111, 117

[56] References Cited

U.S. PATENT DOCUMENTS

| | | | |
|---|---|---|---|
| 381,544 | 4/1888 | Garvey | 294/118 |
| 1,742,232 | 1/1930 | Casale | 294/118 |
| 3,004,362 | 10/1961 | Day | 7/167 |
| 3,150,460 | 9/1964 | Dees | 43/12 |
| 4,057,277 | 11/1977 | Burkholder | 294/50.8 |
| 4,571,766 | 2/1986 | Goldman et al. | 15/105 |
| 5,114,199 | 5/1992 | Newcomer | 294/50.8 |
| 5,206,998 | 5/1993 | Oriente et al. | 294/3 |

FOREIGN PATENT DOCUMENTS 619426 3/1949 United Kingdom .

*Primary Examiner*—Dean Kramer
*Attorney, Agent, or Firm*—Herman H. Bains

[57] ABSTRACT

An aquarium tool kit includes handles, extension members and a plurality of implements including a sponge, scraper, net, rock pickers, brush, scoops, and pinchers. The handles includes a pivotally interconnected handle members which form tongs, and a substantially straight handle member. The extension members are used to adjust the length and angularity of the handles. The handles, extension members and implements have coupling members thereon which permit ready attachment of any implement directly to the handles or to an extension member. The tool kit therefore allows the various implements to be used with a handle for performing any specific function thereby allowing structuring, maintenance, and restructuring of aquariums regardless of size or shape.

5 Claims, 2 Drawing Sheets

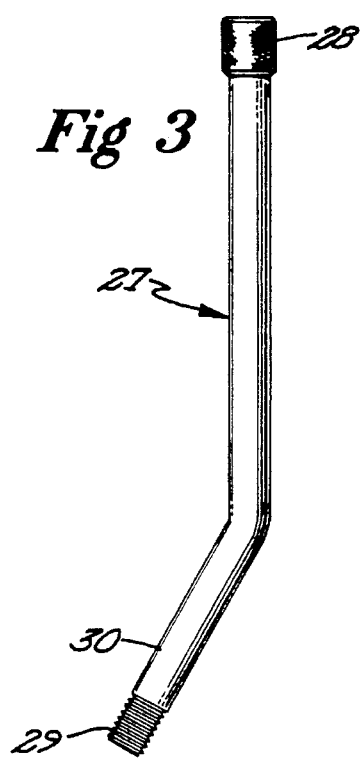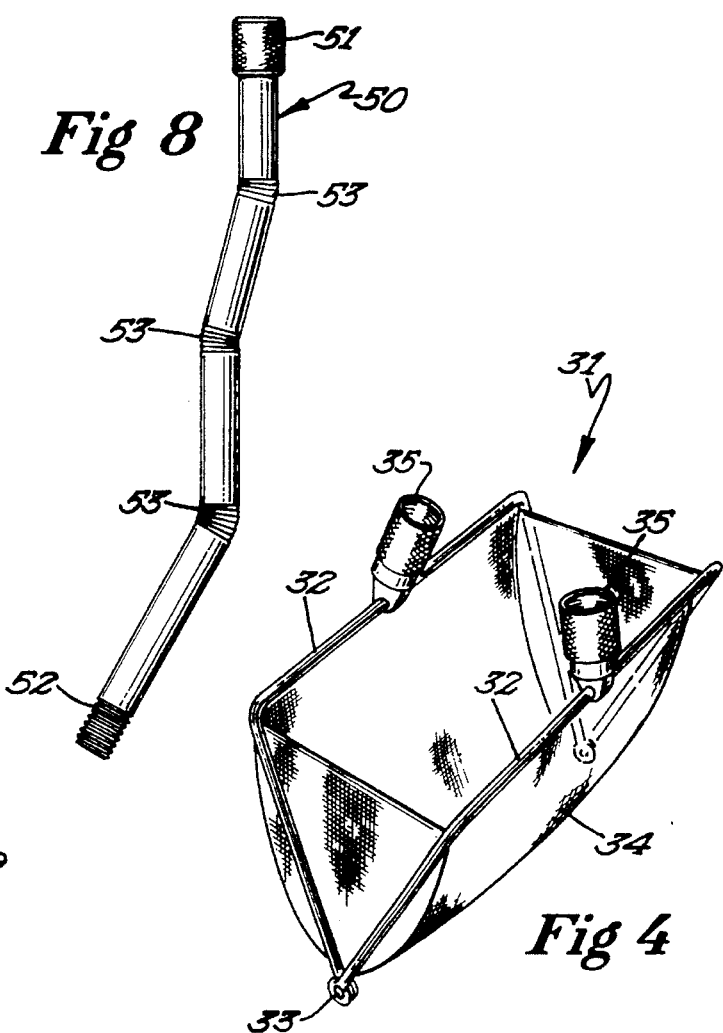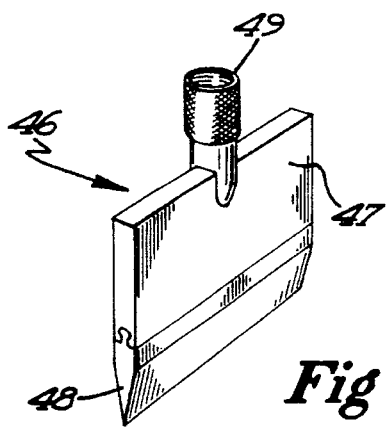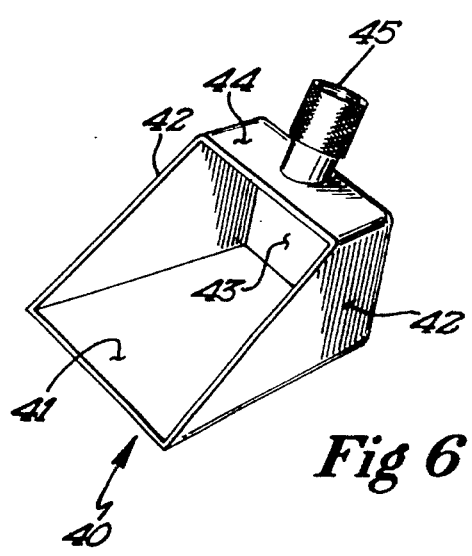

5,601,322

1

AQUARIUM TOOL

BACKGROUND OF THE INVENTION

1. Field of the Invention

This invention relates to an aquarium tool kit and more particularly for an adjustable aquarium tool kit having a wide range of functions.

2. Discussion of the Prior Art

Aquarium tools have been developed for performing certain functions including placement, removal or repositioning items or specimens in an aquariums and for cleaning aquariums. For example, nets are commonly used to remove fish or other live specimens from aquariums, and other tools are used to clean, set up or maintain aquariums. Aquariums vary in size and configuration, and, if all of the necessary tools were available, different size tools or implements for different size aquariums would be required.

In one embodiment of the present invention, the aquarium tool kit has the configuration of tongs for use with several different implements. Although no prior art aquarium tool has tong-like construction of which Applicant is aware, there are implements in different fields which do have the configuration of tongs. For example, U.S. Pat. No. 659,518 discloses a plant cutter and lifter having the configuration of tongs.

U.S. Pat. No. 394,659 discloses a tong-shaped potato digger while U.S. Pat. No. 829,466 discloses an oyster bed digger having the general shape of tongs. U.S. Pat. No. 1,588,929 discloses a tong-shaped garden implement.

U.S. Pat. No. 482,174 discloses a tongs-like device for handling coal, cinders and clinkers. U.S. Pat. No. 5,114,199 discloses a tongs configured device for gathering debris.

However, none of these prior art references discloses an aquarium tool.

SUMMARY OF THE INVENTION

It is an object of this invention to provide an aquarium tool kit which is readily adjustable for use with aquariums of different size and which has a plurality of readily interchangable implements for performing different functions.

In one embodiment of my invention, the aquarium tool kit is in the form of tongs comprising a pair of similar handle members pivotally connected together. Extension sections are readily connectible to the handle sections for adjusting the length of the handle. Various implements including scoops, sponges, nets, tines, blades, brushes and other implements may be readily attached to the handles or the extension sections for accomplishing particular functions. The extension sections include straight and curved sections to permit further adjustment of the tool. A single handle may be used with various implements rather than the tong-configured handles. The adjustability of the tool handle plus the ready interchangability of the various implements allows an aquarium to be maintained, structured, or restructured or cleaned without requiring a user to immerse the user's hands in the aquarium water.

2

Figure 2:
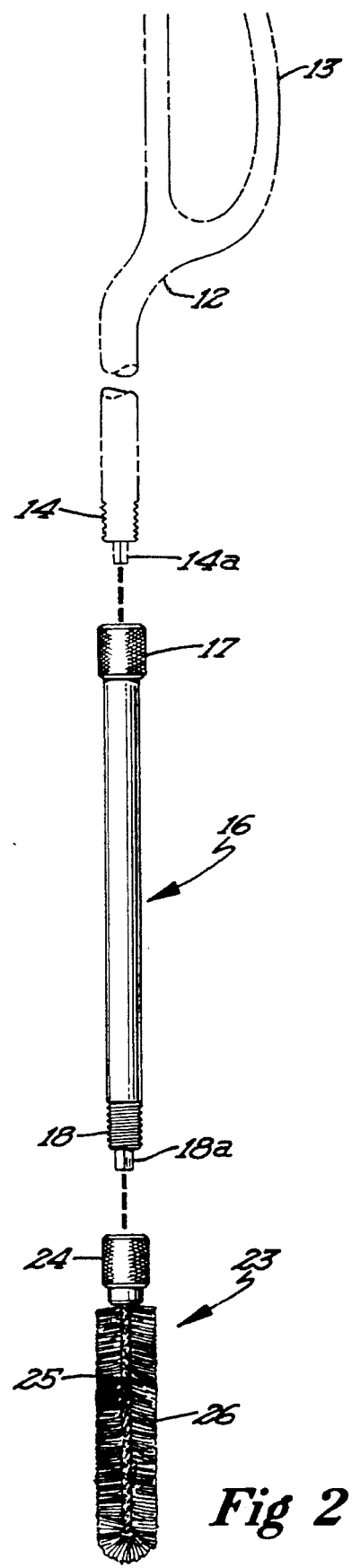

FIG. 2 is an exploded elevational view illustrating a single handle having an extension section and a single implement attached thereto;

FIG. 3 is an elevational view of a different embodiment of an extension section;

FIG. 4 is a perspective view of a double net implement;

FIG. 5 is a perspective view of a sponge implement;

FIG. 6 is a perspective view of a scoop implement and;

FIG. 7 is a perspective view of a cleaning blade implement;

FIG. 8 is a different embodiment of an extension section.

FIG. 9 is a perspective view of one of a pair of pincher implements.

DESCRIPTION OF THE PREFERRED EMBODIMENT

Figure 1:
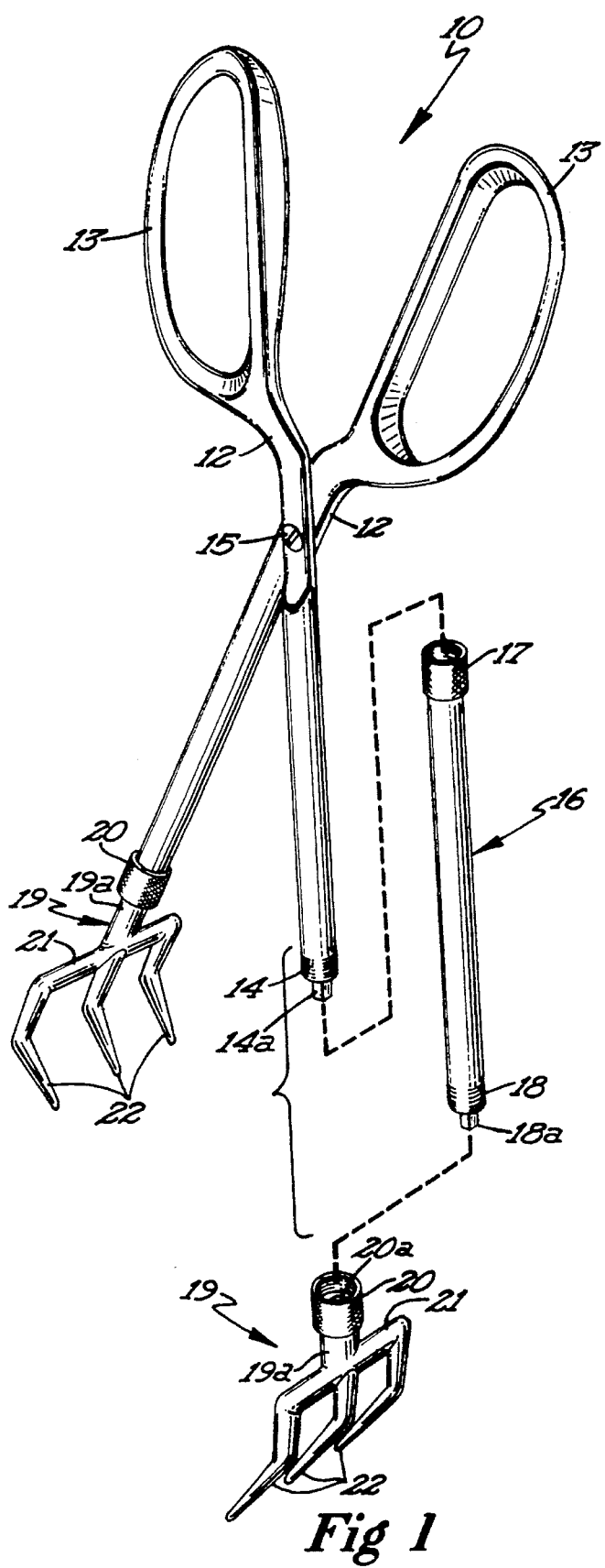
FIG. 1 is an exploded perspective view illustrating the tong-like configuration of the handle of the aquarium tool which includes extension sections and rock-moving implements.

Referring now to the drawings and more specifically to FIG. 1, it will be seen that one embodiment of my novel aquarium tool, designated generally by the reference numeral 10, is thereshown. The configuration of the handle of the aquarium tool 10 is in the form of tongs and includes a pair of substantially identical elongate handle members 12 each having a looped hand grip 13 at one end thereof. It is pointed out that the tool may be formed of a suitable plastic material or alternatively the tool may be formed of a selected metal or metal alloys. The handle members 12 are pivotally connected together by a pivot 15 intermediate their respective ends and each handle member 12 terminates at its lower cylindrical end in an externally threaded cylindrical male coupling element 14. In the embodiment shown, a rectangular male guide element 14a projects axially from the lower end of each handle member.

The aquarium tool also includes elongate cylindrical extension members 16 each having a cylindrical internally threaded female coupling 17 at its upper end for threaded coupling with the male coupling element on one of the handle members 12. The female coupling 17 has a rectangular socket for receiving the guide element 14a therein. The lower end portion of each extension member 16 has a threaded cylindrical male coupling element 18 for threaded connection with a female coupling element on an implement. A rectangular male guide element 18a projects axially from the lower end of the extension element. The extension members interconnect the handle members to an implement or implements.

In FIG. 1, a pair of rock removing implements 19 are shown for attachment to the extension members 16. Each rock removing implement includes a shank 19a which is provided with a cylindrical threaded female coupling element 20 at its upper end. The female coupling element 20 of each implement attaches to the threaded male coupling element of one of the extension members 16. The female coupling element 20 has a rectangular socket 20a for receiving the guide element 18a therein. Each rock removing implement 19 also includes a transverse element 21 integral with the shank 19a and having a plurality of curved tines 22 extending therefrom. It will be seen that when the rock removing implements 19 are secured to the extension members or directly to the handle members 12, the aquarium tool may be used to remove, replace or reposition rocks or similar objects within an aquarium.

It is pointed out that other coupling means may be used instead of the threaded male-female coupling elements. In a preferred form of the coupling means, one handle member or extension member may have a male tapered end portion which frictionally fits within a mating tapered female portion of an extension member or handle member. This type of coupling means will be used with light load-bearing implements.

Still other types of coupling means may also be used. For example, a ball detent type snap coupling be used in lieu of the male and female threaded coupling for connecting the various components together. If a ball detent coupling is used, one of the components (handle, extension member or implement) will have a ball and the other component will have a detent or recess which is a well known coupling arrangement.

Referring now to FIG. 2, it will be seen that a single handle 12 is thereshown rather than the pair of pivotally connected tong-handle members. A number of implements may also be used with a single handle. The single handle is formed by simply removing the pivot 15 which interconnects the handle members 12. The handle 11 therefore comprises a single handle member 12, having a looped hand grip 13 at one end thereof and a male threaded element 14 at its lower end. An extension member 16 (identical to FIG. 1) is threadedly connected to the handle member 12 and is also threadedly connected or coupled to a brush type implement 23. The brush type implement 23 is used for cleaning an aquarium and includes a female coupling element 24 which threadedly couples to the extension member. However, the handle member may be connected directly to an implement or an extension member may interconnect the handle member to an implement. The brush implement 23 also includes a shank 25 having a plurality of bristles secured thereto and extending therefrom. The brush implement 23 is used for cleaning hoses to magnum filters and plastic components for underground filters. In the preferred embodiment, the brush implements for a kit will include a small brush and a large brush.

Referring now to FIG. 3, it will be seen that a different embodiment of the extension member is thereshown and is designated generally by the reference numeral 27. The extension member 27 is similar to the extension member 16 but is bent or curved rather than having a straight or rectilinear configuration as the extension member 16. The extension member 27 has a female threaded coupling element 28 at one end thereof and a male threaded coupling element 29 at the other end thereof. The bent or offset lower end portion of the extension member 27 is disposed at an angle of 30° from the remaining portion of the extension member. Although not shown in the drawing, it is also pointed out that the extension member may have a 90° offset rather than a 30° offset. It is further pointed out that a 90° offset extension member would be used with a single handle while the 30° offset extension would be used with either a single handle member or (FIG. 2) handle having the tong configuration (FIG. 1). The handle members may also vary in length.

Referring now to FIG. 8, it will be seen that a further embodiment of the extension member is thereshown. The cylindrical extension member 50 includes a female threaded coupling element 51 at one end thereof and a male threaded coupling element 52 at the other end thereof. The extension member 50 is also formed of plastic material and includes a plurality of bendable portions 53 at spaced locations along the length of the extension member. These bendable portions permit the extension member to be selectively bent at a number of locations, thereby allowing the extension member 50 to have a wide range of configurations. This particular characteristic of the extension member allows the aquarium tool to be adjusted for access to difficult areas within an aquarium. The extension member 50 may therefor be used with both a single handle member or the tongs configuration handle.

Referring now to FIG. 4, it will be seen that a different implement is thereshown and comprises a double net 31 which is adapted for use with the tongs type handle . The double net 31 has a purse-like configuration and includes a pair of U-shaped frames 32 formed of rigid material such as plastic, metal or the like which are hingedly connected to a hinge 33 to permit the U-shaped frames to pivot towards and away from each other. A mesh type net 34 is secured to the U-shaped frames and extends between the legs of the U-shaped frames as illustrated in FIG. 4. Each transverse member 32 of the U-shaped frame has a female threaded coupling element 35 pivotally connected thereto and projecting therefrom. The female threaded coupling elements 35 are adapted to be threadedly connected to the handle members 12 of the tong-type handle of FIG. 1 or the double net may be connected to extensions members which are connected to the handle members. The double net 31 may be used to catch fish or other live specimens for removal, transfer or replacement with respect to an aquarium.

It is also pointed out that a conventional single net (not shown) having a female coupling element may be provided and the single net will be used with a single handle illustrated in FIG. 2.

Referring now to FIG. 5, it will be seen that another implement, designated generally by the reference numeral 36, is thereshown and comprises a sponge type implement used in cleaning or scrubbing an aquarium. The sponge includes a plate 37 to which is secured a rectangular shaped sponge 38. The plate 37 also has a female threaded coupling element 39 secured thereto and projecting therefrom. The sponge implement 36 may be used with both the single handle member or the tongs configured handle members in cleaning an aquarium.

Referring now to FIG. 6, it will be seen that another implement, designated by the reference numeral 40, is thereshown. The implement 40 comprises a scoop which is used to retrieve objects or items located on the bottom of an aquarium. The scoop 40 includes a bottom wall 41, side walls 42 integrally formed therewith and a rear wall 43 and is integral with the side walls, bottom wall and a top wall portion 44. A threaded female coupling element 45 is secured to the top wall portion 44 of the scoop 40 and is adapted to be connected to a handle member or extension member. The scoop 40 may be used with a single handle member or the tongs configured handle of FIG. 1.

Referring now to FIG. 7, it will be seen that another implement, designated by the reference numeral 46, is thereshown and comprises a scrapper for scraping the sides of the aquarium. It will be appreciated that algae commonly grows on the inner surfaces of aquariums and is usually removed by scrapper type implement. The scrapper 46 includes a holder 47 having a recess therein into which is pressed a blade 48. The blades are held within the holder by a tongue and groove connection as shown in FIG. 1.

A female coupling element 49 is secured to the holder and projects therefrom. The scapper implement 46 is intended to be used with a single handle member of the embodiment of FIG. 2 and may be attached to the handle member itself or to an extension thereof.

Referring now to FIG. 9, it will be seen that one of a pair of pincher type implements 60 is thereshown. Each pincher implement 60 includes flat end portion 62 connected by a shank to an internally threaded female coupling element 61. The pincher elements 60 are used in pairs and are coupled to the tong-type handle of FIG. 1. The pincher elements are used to pick up items hard to reach and are used to dislodge rocks.

The aquarium tool is preferably sold as a kit and will include a plurality of components including handles, extension members and implements. For example, a typical kit will include a double tongs-type handle, a separate single handle, several extension members including both straight and angular extension members. The extension members for a kit may include 30° angular extension members as well as 90° angular extension members. Extension members having other angles may also be provided.

The aquarium tool kit will also include several different implements including rock removers (FIG. 1), brushes (FIG. 2), a sponge (FIG. 4), a net or nets (FIG. 5), a scraper (FIG. 6), scoops (FIG. 7) and a pair of pinchers (FIG. 9). The implements allow a user to perform most, if not all, of the specific structuring and maintenance functions for aquariums. The straight and angular extension members along with the various implements permit use of the aquarium tool with various sized and shaped aquariums.

Thus it will be seen that I have provided a novel aquarium tool kit which is more efficient and adaptable than any heretofore known prior art devices.

What is claimed is:

1. An aquarium tool kit for use in structuring, maintaining and restructuring aquariums of any size and shape, comprising a pair of elongate handle members pivotally interconnected together intermediate their ends, each of said handle members having a hand grip element at one end thereof and a coupling element at the other end thereof, an aquarium implement for performing a specific function selected from the group comprising a pair of tined rock grippers, a double net, a pair of pincher elements, a scoop, a brush, a sponge, and a blade, said implement having coupling means secured thereto, a pair of elongate extension members each having a coupling element on each end thereof and each extension member including a bendable portion intermediate the ends thereof to permit adjustment of the angular shape of each extension member, said handle members, aquarium implements and extension members being sized and dimensioned for exclusive use in aquariums, each extension member being releasably coupled to one of said handle members and an implement whereby a selected implement is coupled to an extension member for performing a specific function.

2. The aquarium tool kit as defined in claim 1 wherein said aquarium implement comprises a pair of tined rock grippers.

3. The aquarium tool kit as defined in claim 1 wherein said aquarium implement comprises a double net.

4. The aquarium took it as defined in claim 1 wherein said aquarium implement comprises a pair of pincher elements.

5. An aquarium tool kit for use in structuring, maintaining and restructuring aquariums of any size and shape, comprising a pair of elongate handle members pivotally interconnected together intermediate their ends, each of said handle members having a hand grip element at one end thereof, and a coupling element at the other end thereof, a plurality of aquarium implements for performing specific functions including a pair of tined rock grippers, a double net, a pair of pincher elements, a scoop, a brush, a sponge, and a blade, each implement having coupling means secured thereto, a pair of elongate extension members each having a coupling element on each end thereof and each extension member including a bendable portion intermediate the ends thereof to permit adjustment of the angular configuration of each extension member, said handle members, aquarium implements, and extension members being sized and dimensioned for exclusive use in aquariums, each extension member being releasably coupled to one of said handle members and an implement whereby a selected implement is coupled to an extension member for performing a specific function.

\* \* \* \* \*